United States Patent Office

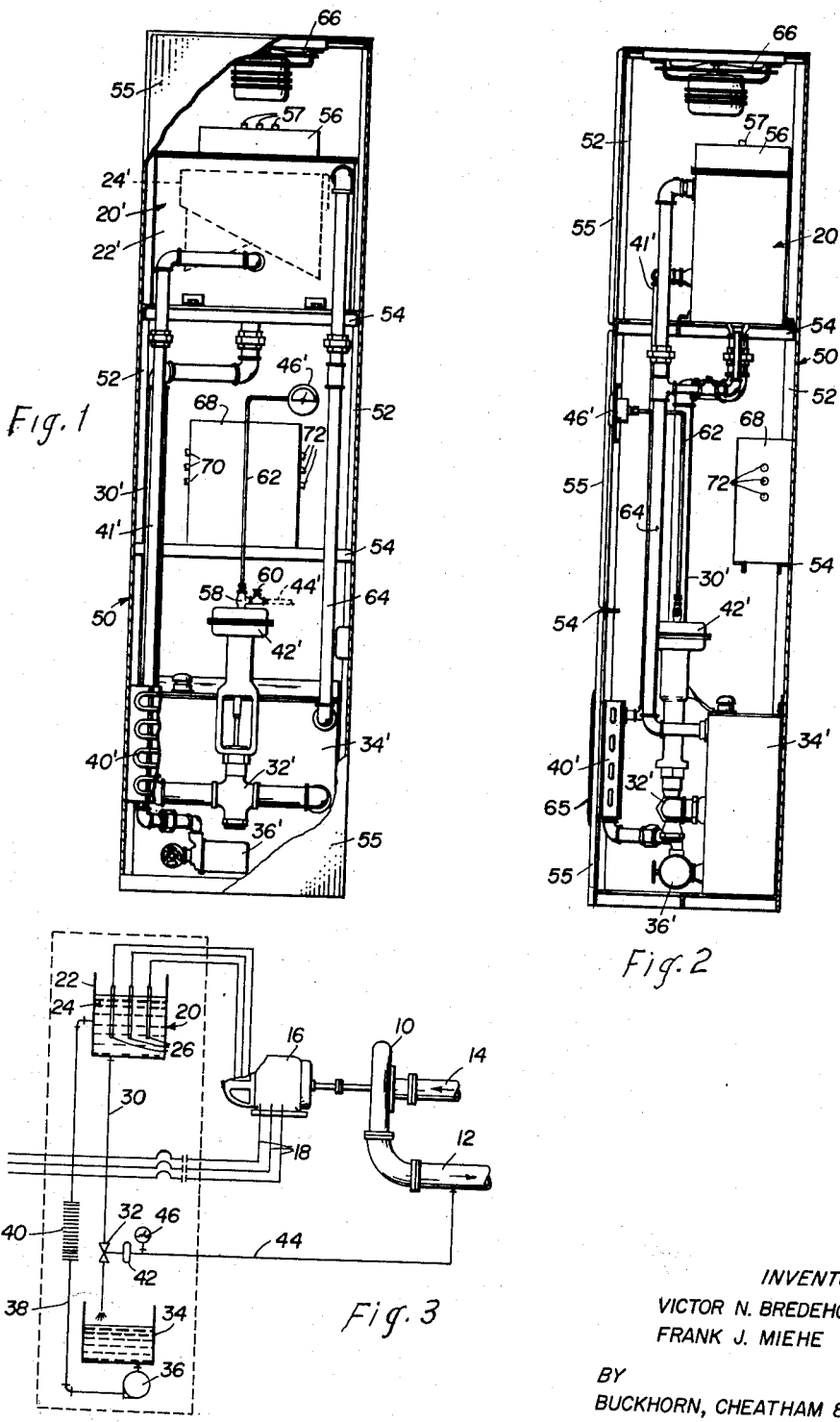

3,123,005
Patented Mar. 3, 1964

3,123,005
MOTOR SPEED CONTROL
Victor N. Bredehoeft, Corvallis, and Frank J. Miehe, Portland, Oreg., assignors to General Services Company, Corvallis, Oreg., a corporation of Oregon
Filed Apr. 2, 1962, Ser. No. 184,163
1 Claim. (Cl. 103—35)

The present invention relates to a motor speed control arrangement and more particularly to an arrangement for controlling the speed of a motor and pump in a fluid system.

A particular object of the present invention is to provide a new and improved arrangement for varying the level of electrolyte in a liquid rheostat connected to control the speed of an electric motor.

More specifically it is an object of the present invention to provide an inexpensive liquid rheostat control system for a motor which will occupy a minimum of floor space and also have a minimum of operating parts.

Still another object of the invention is to provide a rheostat control system for controlling the speed of a motor driven pump that can be easily adapted for controlling the pump to deliver over various ranges of pressure.

A further object of the invention is to provide a control system that has inherent fail-safe characteristics.

These, and other objects of the invention will become more apparent hereinafter.

In accordance with the illustrated embodiment, the present invention comprises a motor connected to drive a pump discharging fluid to a system in which it is desired to maintain a relatively constant pressure. The speed of the motor, and thus the pump, is controlled through a liquid rheostat from which electrolyte may discharge under gravity flow to a reservoir, the rate of discharge being controlled by a valve which is in turn controlled by suitable means responsive to the pressure in the fluid system to which the pump discharges. The valve is so controlled that upon a rise in the pressure in the fluid system the valve is opened allowing the rate of discharge of electrolyte from the chamber to increase, the converse occurring upon a decrease in pressure in the fluid system. A circulating pump is provided for pumping fluid from the reservoir to the electrolyte chamber at a constant rate whereupon closing of the discharge valve will cause the fluid height in the rheostat to increase thus increasing the speed of the motor, whereas opening of the discharge valve will cause the fluid level in the rheostat to drop causing the pump speed to decrease so that a substantially constant pressure in the discharge of the pump may be maintained.

For a more detailed description of the invention reference is made to the following specification and the accompanying drawings, wherein FIG. 1 is an elevation partly broken away of a control unit embodying the invention;

FIG. 2 is a section taken along line 2—2 of FIG. 1; and

FIG. 3 is a schematic representation of a control system constructed in accordance with the invention.

Referring first to FIG. 3, the invention is illustrated in connection with a system including a pump 10 which it is desired to drive so as to maintain a relatively constant pressure in the discharge line 12 thereof. The pump can be supplied with fluid from any suitable source from an intake line 14. Such a pumping system is desired, for example, in multistoried buildings where it is desired that the water system have constant pressure regardless of demand or pump suction pressure variations.

Connected to the pump 10 to drive the same is a variable speed motor 16 which may be, for example, a wound rotor induction type motor which may be supplied with power from a suitable source through transmission lines 18. As is well known, the speed of such motors can be controlled by varying the resistance in the rotor circuit. In accordance with the present invention the resistance in the rotor circuit is provided by means of a liquid rheostat 20 comprising a chamber 22 containing a supply of electrolyte 24 in which are fixedly suspended a plurality of spaced-apart electrodes 26 connected in known manner to the rotor. As will be apparent, by decreasing the level of the electrolyte 24 in the chamber 22 the resistance between the electrodes 26 will increase and the speed of the motor 16 will decrease. Conversely, increasing the level of the electrolyte 24 will decrease the resistance between the electrodes 26 and the speed of the motor 16 will be increased.

Means are provided for varying the level of the electrolyte 24 in response to changes in pressure in the discharge line 12 whereby the speed of the motor is increased or decreased as necessary to maintain a substantially constant pressure within such discharge line. In accordance with the invention the chamber 22 is provided with a drain line 30 in which is mounted a regulating valve 32 which can be controlled to regulate the rate of flow through the drain line 30 which discharges into a reservoir 34. Means are provided to return the electrolyte from the reservoir 34 to the chamber 22 at a constant rate, such means including a constant rate pump 36 connected to pump liquid from the sump 34 and to deliver the same to the chamber 22 through a discharge line 38. If desired, a heat exchanger 40 may be provided in the discharge line 38 to dissipate heat in the electrolyte being returned to the electrolyte chamber 22.

Operatively connected to the valve 32 is a pressure responsive valve operating means diagrammatically indicated at 42. Such operating means may be integral with the valve or may be separate therefrom with a suitable operative connection, such valve control means being well-known to the art. The valve 32 may be, for example, a conventional diaphragm operated control valve adjusted so that at the desired pressure in the pump discharge 12 the rate of flow through the valve is substantially equal to the pumping rate of the circulating pump 36. In any event the valve control means 42 is operatively connected by a sensing means to the pump discharge line 12 so that the valve 32 may be operated in response to changes in the pressure in line 12. If, for example, a diaphragm operated valve is utilized the chamber thereof may be connected by a tube 44 to the pump discharge line 12 in such a manner that the valve 32 will be urged toward its open position upon an increase in pressure in line 12 and will be urged toward its closed position upon a decrease in pressure in the discharge line 12. Since electrolyte is being returned at a constant rate by the pump 36 to the chamber 22, opening the valve 32 will effect a drop in the level of the electrolyte in the rheostat whereupon the speed of the motor 16 and thus the pump 10 will decrease so that the pressure in the line 12 will also decrease. On the other hand, upon a decrease in pressure in the line 12, and movement of the valve 32 toward closed position the level of the electrolyte 24 will increase and the speed of the motor 16 likewise increase to drive the pump faster whereupon the pressure in the discharge line 12 will tend to increase. Thus, the rate of the pump 10 will be varied as necessary to maintain a substantially uniform pressure in the discharge line 12.

A gauge 46 may be provided in the line 44 to indicate the pressure in the pump discharge line 12.

While the arrangement for controlling the speed of the motor 16 has been shown in connection with a fluid system, it will be obvious that the control arrangement can be utilized to control a motor in response to changes in the conditions of many varied systems.

Referring now to FIGS. 1 and 2, a commercial embodiment of the control unit of the invention comprises a cabinet 50 including vertical supporting frame members 52 and horizontal members 54 and enclosing plates 55 some of which may be hinged to provide access. Suitably supported in the cabinet 50 near the top portion thereof is a rheostat 20' including a chamber 22' in which a plurality of electrodes indicated in dotted lines at 24' are supported. Mounted on the top of the chamber 22' is a junction box 56 having suitable terminals 57 to which may be connected electrical leads for connection of the plates 24' in known manner to the rotor terminals of the motor to be controlled.

A reservoir tank 34' is mounted in the bottom of the cabinet 50 and to which electrolyte from the chamber 22' may pass through a drain line 30' in which is mounted a valve 32' controlled by pressure sensitive, diaphragm type valve operating mechanism 42'. A connector 58 is provided on the valve operator 42' for connecting thereto a sensor line 44' leading to the discharge of the pump to be controlled. A needle valve 60 may also be provided in the connector. Mounted in a face panel of the cabinet is a pressure gauge 46' which is connected to the connector 60 by piping 62. An overflow line 64 may also be provided on the chamber 22'.

A circulating pump and motor 36' is provided to pump the electrolyte from the reservoir 34' first through a cooling coil 40' and thence through a return line 41' to the rheostat chamber 22'. A grill 65 is preferably provided in the wall of the cabinet adjacent the coil 40' and an exhaust fan 66 is provided at the top of the cabinet to cause circulation of cooling air through the cabinet. If desired a conventional motor starter unit 68 may be mounted in the cabinet beneath the chamber 22' and suitable terminals 70, 72 provided for connecting the same to the motor to be controlled and to a source of power.

The cabinet 50 and components mounted therein are provided as a single unit to the user who need only to connect the starter unit to the power supply and the motor to be controlled and the rotor of the motor to the terminals of the rheostat 20' and supply power to the motors of the fan 66 and pump 30'.

After filling the chamber 22' and reservoir 34' with suitable electrolyte such as distilled water and installing a sensor line from valve regulator 42' to the pump discharge the unit may be placed in operation to function as described previously. It will be apparent that by adjusting the regulator 42' the range of control can be varied.

It will be apparent that the control arrangement described is simple in construction and operation having a minimum of operating parts and it will occupy, as apparent, very little floor space. It is therefore adapted to be installed for the control of motors in existing pumping installations.

Having illustrated and described a preferred embodiment of our invention, it should be apparent to those skilled in the art that the invention permits of modification in arrangement and detail. We claim as our invention all such modifications as come within the true spirit and scope of the appended claim.

We claim:
In a fluid system,
a pump for supplying fluid to said system,
a slip ring motor connected to said pump to drive the same,
a control unit for controlling the speed of said motor so as to maintain a relatively constant pressure of fluid in said system,
said unit comprising a cabinet,
a liquid rheostat including an electrolyte chamber mounted in said cabinet adjacent the top portion thereof, and a plurality of electrodes mounted in said chamber,
a reservoir mounted in said cabinet beneath said chamber,
a drain line in the bottom of said chamber discharging into said reservoir,
a valve in said drain line for regulating the rate of flow therethrough,
a pressure responsive valve operating means connected to said pump to detect the discharge pressure thereof and connected to said valve for operating the same,
constant flow pump means for returning electrolyte from said reservoir to said chamber,
and means connecting said electrodes to said slip ring motor.

References Cited in the file of this patent
UNITED STATES PATENTS

| | | |
|---|---|---|
| 696,065 | Miller | Mar. 25, 1902 |
| 1,332,167 | De Wein | Feb. 24, 1920 |
| 1,409,670 | Chubb | Mar. 14, 1922 |
| 1,590,509 | Hibbard | June 29, 1926 |
| 1,745,510 | Seeger | Feb. 4, 1930 |
| 1,910,202 | Crago | May 23, 1933 |
| 2,734,458 | Hayes | Feb. 14, 1956 |
| 2,797,284 | Brooke | June 25, 1957 |
| 3,021,789 | Ryden | Feb. 20, 1962 |